United States Patent
Hirai (10) Patent No.: US 9,506,572 B2
(45) Date of Patent: Nov. 29, 2016

(54) FLOW REGULATING DEVICE

(71) Applicant: Surpass Industry Co., Ltd., Saitama (JP)

(72) Inventor: Kazuki Hirai, Saitama (JP)

(73) Assignee: Surpass Industry Co., Ltd., Gyoda-shi, Saitama (JP)

( * ) Notice: Subject to any disclaimer, the term of this patent is extended or adjusted under 35 U.S.C. 154(b) by 156 days.

(21) Appl. No.: 14/201,084

(22) Filed: Mar. 7, 2014

(65) Prior Publication Data
US 2014/0252261 A1  Sep. 11, 2014

(30) Foreign Application Priority Data
Mar. 7, 2013  (JP) .................. 2013-045303

(51) Int. Cl.
*F16K 7/12*  (2006.01)
*G05D 7/03*  (2006.01)

(52) U.S. Cl.
CPC .. *F16K 7/12* (2013.01); *G05D 7/03* (2013.01)

(58) Field of Classification Search
CPC .................................. F16K 7/12; G05D 7/03
USPC .............................................. 251/61.2, 61.3
See application file for complete search history.

(56) References Cited

U.S. PATENT DOCUMENTS

| | | | | |
|---|---|---|---|---|
| 4,694,848 A * | 9/1987 | Jorgensen | ............... | F16K 37/00 137/114 |
| 5,829,473 A * | 11/1998 | Hajbi | ................... | F16K 31/126 137/315.28 |
| 6,079,437 A * | 6/2000 | Beutler | ................ | F16K 31/385 137/181 |
| 7,163,024 B2 | 1/2007 | Igawa et al. | | |
| 7,475,863 B2 * | 1/2009 | Donovan | ............... | F16K 31/402 251/285 |
| 7,650,903 B2 * | 1/2010 | Yamamoto | ........... | F16K 31/126 137/487.5 |
| 7,878,479 B2 * | 2/2011 | Yamamoto | ................ | F16K 1/36 251/331 |
| 8,292,262 B2 * | 10/2012 | Hasunuma | ................ | F16K 7/12 137/513.3 |
| 9,010,719 B2 * | 4/2015 | Hirai | ................... | F16K 31/1266 251/61.1 |
| 2006/0289816 A1 | 12/2006 | Weingarten | | |

FOREIGN PATENT DOCUMENTS

| | | |
|---|---|---|
| JP | 2004 162774 A | 10/2004 |
| JP | 2005-196401 A | 7/2005 |
| WO | WO 99/54797 A1 | 10/1999 |

OTHER PUBLICATIONS

European Search Report for European Application No. 14157755.1 dated Feb. 2, 2015.

* cited by examiner

*Primary Examiner* — Marina Tietjen
*Assistant Examiner* — Daphne M Barry
(74) *Attorney, Agent, or Firm* — Muncy, Geissler, Olds & Lowe, P.C.

(57) ABSTRACT

A flow regulating device 1 is provided which includes: a housing 10c including a pressure chamber 12 formed therein; a second housing 10b including a first space 22 formed therein; a valve element 31 which forms a closed state in which communication is shut off between an upstream flow channel 15 and a downstream flow channel 16, or an open state in which communication is provided between the upstream flow channel 15 and a downstream flow channel 16; a diaphragm 35 connected to the valve element 31; a guide member 42 connected to the diaphragm 35 which is movable in an axial direction of the valve element 31 with the movement of the valve element 31 while being in a state in which the guide member 42 is in contact with an inner circumferential surface of the pressure chamber 12.

12 Claims, 4 Drawing Sheets

FLOW REGULATING DEVICE

CROSS-REFERENCE TO RELATED APPLICATIONS

This application is based on Japanese Patent Application No. 2013-045303, the contents of which are incorporated herein by reference in its entirety.

TECHNICAL FIELD

The present disclosure relates to a flow regulating device for regulating the flow rate of fluids including, for example, liquid chemical, pure water and the like.

BACKGROUND ART

Generally, flow regulating devices are used to adjust the flow rate of fluids including liquid chemical, pure water, or the like for producing semiconductor devices or the like. Since such a flow regulating device is required to contain a fluid flowing in a flow channel defined therein, it includes a housing made of a resin material such as fluororesin that is excellent in chemical resistance (Refer to PTL 1, for example).

PTL 1 discloses a flow regulating device including a diaphragm, a pressure chamber provided above the diaphragm, and a fluid chamber provided below the diaphragm. In the fluid regulating device, a valve element is connected to the lower portion of the diaphragm, the flow rate of fluid is adjusted by adjusting the pressure of air supplied to the pressure chamber.

CITATION LIST

Patent Literature (PTL 1)
Japanese Unexamined Patent Application, Publication No. 2004-162774

SUMMARY

Technical Problem

In the flow regulating device disclosed in PTL 1, when the fluid flow is shut off in a downstream flow channel that is connected to an outlet port, the pressure in the fluid chamber which is in contact with the diaphragm increases. Then, the diaphragm receives the pressure in the fluid chamber to cause an urging force in a direction to bring the valve element connected to the diaphragm into contact with a valve seat. When the valve element is in contact with the valve seat to shut off the fluid flow, the urging force further urges the valve element into contact with the valve seat.

However, in the flow regulating device disclosed in PTL 1, the center portion (base portion) of the diaphragm to which an end of the valve element is connected is not positioned at a certain position in the pressure chamber. Thus, there is a possibility that misalignment occurs between the center axis of the valve element and the center position of a valve chamber in which the valve element is accommodated. The occurrence of the misalignment of the center axes (axial misalignment) is likely to create a gap between the valve element and the valve seat even if the above described urging force further urges the valve element into contact with the valve seat.

When the gap is created between the valve element and the valve seat, the fluid flows from the upstream of the contact location between the valve element and the valve seat to the downstream thereof, thereby failing to properly shut off the fluid.

The present invention has been made in view of the above described problem, and has an object to provide a flow regulating device with improved fluid shut-off performance at the contact location between a valve element part and a valve seat part.

Solution to Problem

In order to solve the above described problem, the flow regulating device of the present invention adopts the following solutions.

The flow regulating device according to the present invention includes: a first housing including a pressure chamber formed therein into which an operating gas is externally introduced; a second housing including a valve chamber formed therein, an upstream flow channel formed therein for providing communication between the valve chamber and an inlet port, and a downstream flow channel formed therein for providing communication between the valve chamber and an outlet port; a valve element part housed in the valve chamber, the valve element part being movable into contact with or away from a valve seat part provided on an inner circumferential surface of the valve chamber so as to form a closed state in which communication is shut off between the upstream and downstream flow channels, or an open state in which communication is provided between the upstream and downstream flow channels; a diaphragm connected to the valve element part, the diaphragm having a fluid facing surface which faces a fluid, and a gas facing surface which faces the operating gas; and a guide member connected to the diaphragm, the guide member being movable in an axial direction of the valve element part with the movement of the valve element part while being in a state in which the guide member is in contact with an inner circumferential surface of the pressure chamber.

In the flow regulating device according to the present invention, the diaphragm is connected to the valve element part which forms a closed state in which communication is shut off between the upstream and downstream flow channels, or an open state in which communication is provided between the upstream and downstream flow channels, and the guide member is connected to the diaphragm. The guide member is movable in the axial direction of the valve element part with the movement of the valve element part while being in the state in which the guide member is in contact with the inner circumferential surface of the pressure chamber.

This configuration suppresses axial misalignment of the valve element part which is connected to the guide member, thereby bringing the center axis of the valve element part into alignment with the center position of the valve chamber in which the valve element part is accommodated. Thus, a flow regulating device can be provided in which, when a valve element part is in contact with a valve seat part, creation of a gap between the valve element part and the valve seat part is suppressed to thereby improve fluid shut-off performance at the contact location between the valve element and the valve seat.

In the flow regulating device according to a first aspect of the present invention, the pressure chamber includes a wide portion having a greater width in a diametrical direction perpendicular to the axial direction, and a narrow portion located at a farther position from the valve seat part than the wide portion, and having a smaller width in the diametrical direction than the wide portion, and the guide member includes a first guide portion having substantially the same width as the narrow portion, and a second guide portion having a width that is greater than the first guide portion and is equal to or smaller than the wide portion.

In the flow regulating device of the above aspect, the guide member connected to the valve element part via the diaphragm includes the first guide portion having substantially the same width as the narrow portion in the pressure chamber, and the first guide portion is positioned in the narrow portion of the pressure chamber such that the first guide portion is movable with the movement of the valve element part. Thus, the center axis of the pressure chamber is brought into alignment with the center axis of the valve element part to properly position the first guide portion at the narrow portion such that no gap is created between the valve element part and the valve seat part.

In addition, as the narrow portion is located at a farther position from the valve seat part than the wide portion, axial misalignment caused at a farther position from the valve seat part can be properly suppressed so as to prevent the creation of a gap between the valve element and the valve seat.

Moreover, in the flow regulating device of the above aspect, the second guide portion to which the pressure of fluid is transmitted through the diaphragm, has a width that is greater than the first guide portion having substantially the same width as the narrow portion of the pressure chamber. Thereby, even when the diaphragm receives a high pressure from the fluid, the second guide portion is restricted from entering into the narrow portion, and thus the diaphragm can be prevented from becoming excessively deformed.

Thus, according to the above aspect, a flow regulating device can be provided in which fluid shut-off performance is improved at the contact location between a valve element part and a valve seat port while preventing excessive deformation of a diaphragm.

In the flow regulating device of the above aspect, the second guide portion may have substantially the same width as the wide portion. This allows the second guide portion to be properly positioned in the wide portion of the pressure chamber such that the second guide portion is movable with the movement of the valve element part. Thus, the flow regulating device is provided which is capable of preventing creation of a gap between the valve element part and the valve seat part to improve fluid shut-off performance at the contact location between the valve element part and the valve seat part.

In the flow regulating device configured as described above, grooves may be provided at a plurality of sites on an outer circumferential surface of the second guide portion, wherein the grooves extend along the axial direction and enable the passage of the operating gas therethrough between the inner circumferential surface of the wide portion of the pressure chamber and the outer circumferential surface of the second guide portion.

This configuration enables the passage of the operating fluid in the pressure chamber, thereby allowing the pressure to be uniform in the pressure chamber, which facilitates the smooth movement of the guide member in the pressure chamber.

In the flow regulating device of the above aspect, the diaphragm may be configured to include a base portion having substantially the same width as the second guide portion, and an annular thin film portion provided at the outer peripheral edge of the base portion.

This configuration allows the pressure received by the base portion of the diaphragm from the fluid is transmitted to the second guide portion, thereby preventing the base portion of the diaphragm from becoming excessively deformed by the pressure from the fluid.

In the flow regulating device configured as described above, the second guide portion may be formed of a material with a higher strength than that of the base portion.

This ensures that the base portion of the diaphragm is prevented from becoming excessively deformed by the pressure from the fluid.

In the flow regulating device of the above aspect, the first housing may be configured to include a first flow channel for introducing the operating gas into the narrow portion of the pressure chamber, and a second flow channel for introducing the operating gas from the first flow channel into the wide portion of the pressure chamber without having the operating gas pass through the narrow portion.

This configuration enables the operating gas to be introduced into the narrow portion and the wide portion, respectively, of the pressure chamber, thereby allowing the pressure of the operating gas to be uniform in the pressure chamber, which facilitates the smooth movement of the guide member in the pressure chamber.

In a flow regulating device according to a second aspect of the present invention, the diaphragm is integrally formed with the guide member. This configuration reduces the number of assembly man-hours for the flow regulating device, and allows the products to be manufactured with less variations caused due to assembly errors from product to product.

Advantageous Effects of Invention

According to the present invention, a flow regulating device with improved fluid shut-off performance at the contact location between a valve element part and a valve seat part, can be provided.

DESCRIPTION OF EMBODIMENTS

Hereinafter, a flow regulating device in accordance with one embodiment of the present invention is described with reference to FIGS. 1 to 5.

Figure 1:
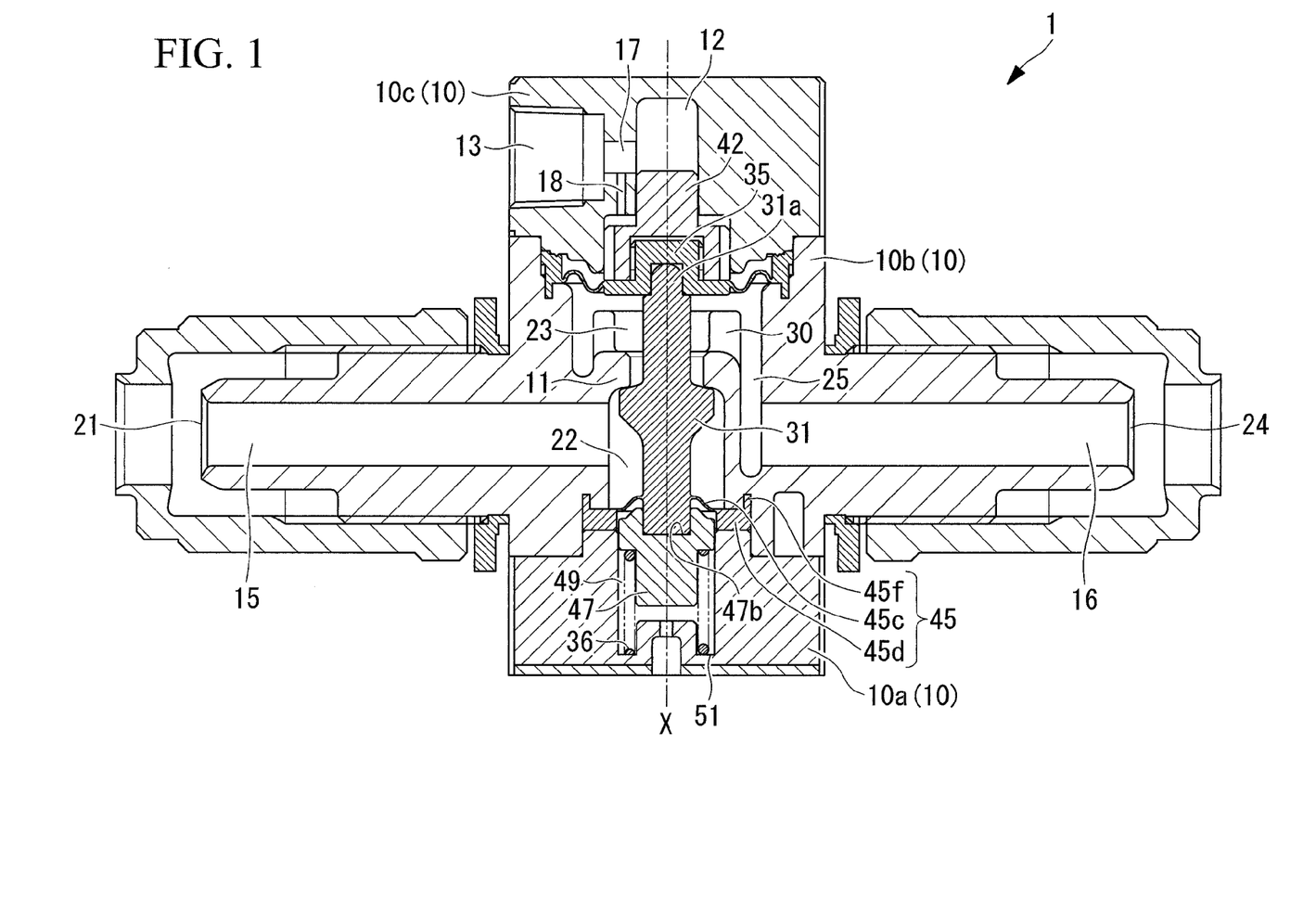
FIG. 1 is a vertical cross-sectional view showing a flow regulating device of one embodiment of the present invention in a fully closed state thereof.
Figure 2:
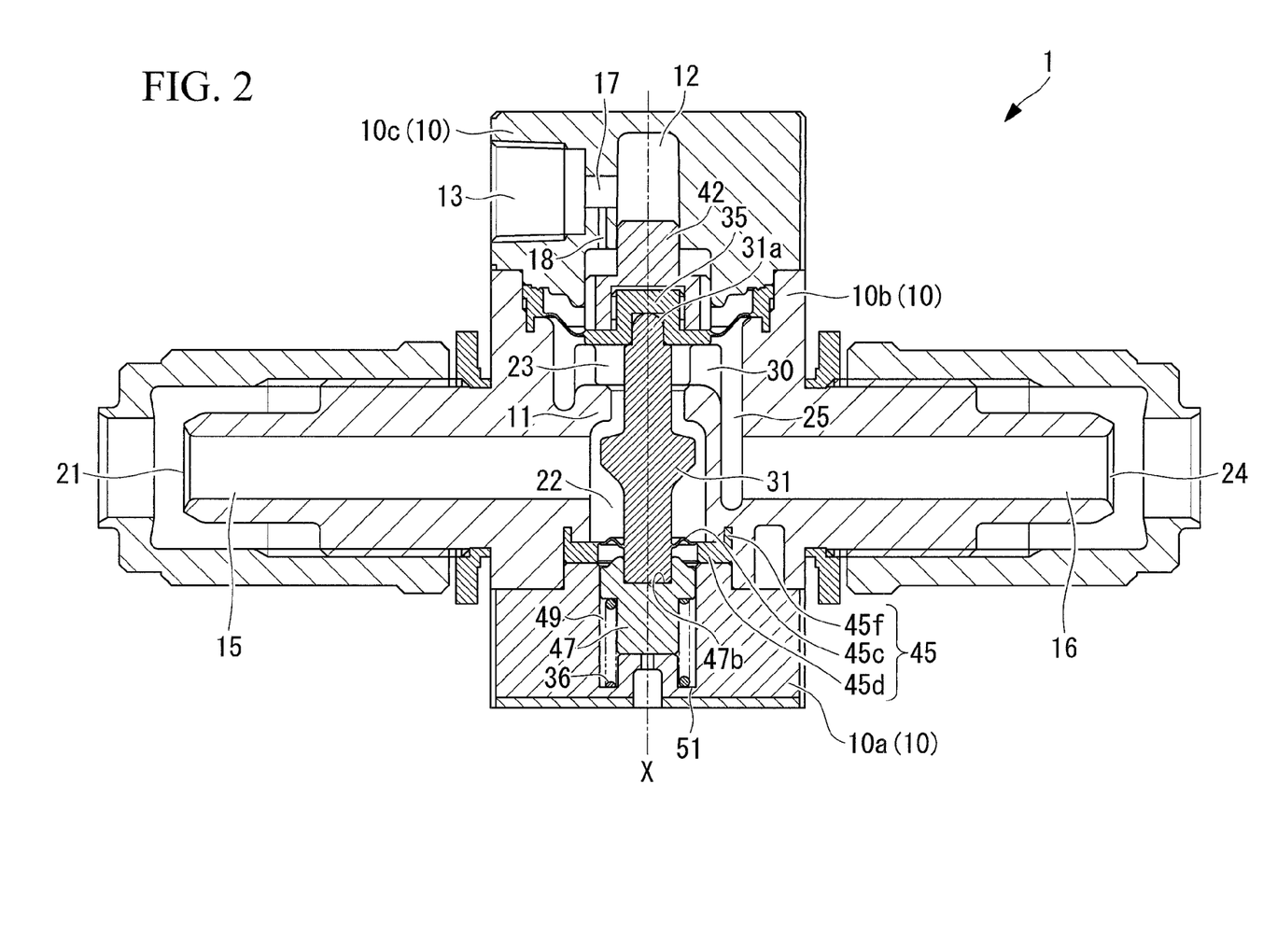
FIG. 2 is a vertical cross-sectional view showing the flow regulating device of the present embodiment in a fully open state thereof.
Figure 3:
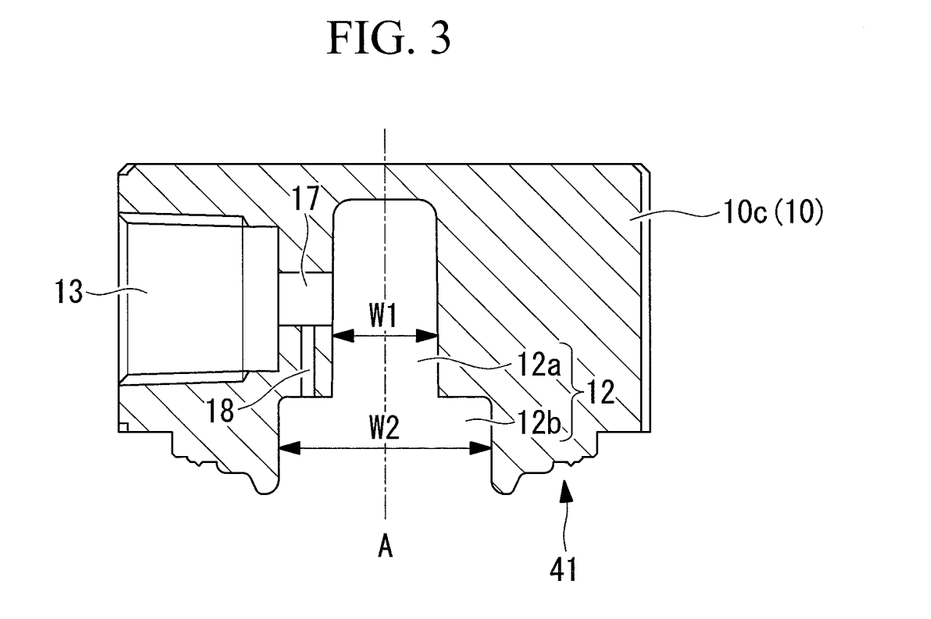
FIG. 3 is a vertical cross-sectional view showing a housing.
Figure 4:
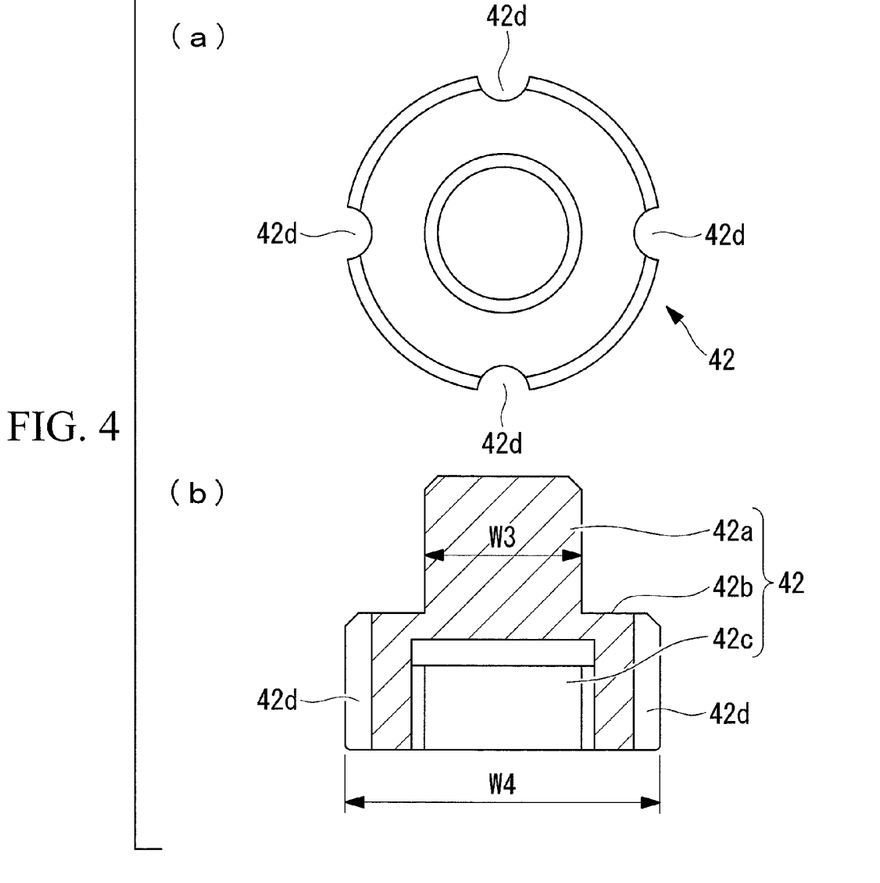
FIG. 4A is a plan view of a guide member.
FIG. 4B is a vertical cross-sectional view of the guide member.
Figure 5:
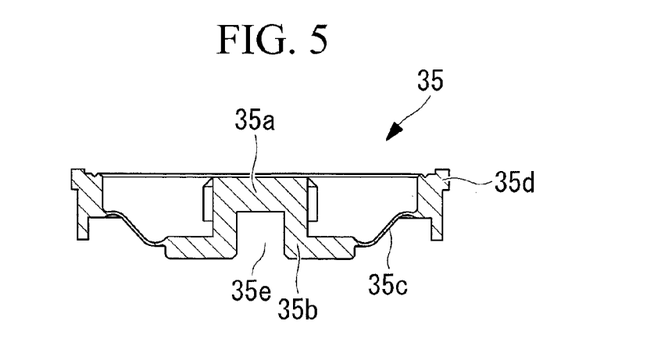
FIG. 5 is a vertical cross-sectional view of a diaphragm.

FIG. 1 is a vertical cross-sectional view showing the flow regulating device in a fully closed state thereof, FIG. 2 is a vertical cross-sectional view showing the flow regulating device in a fully open state thereof, FIG. 3 is a vertical cross-sectional view showing a housing 10c, FIGS. 4A and 4B show a guide member 42, and FIG. 5 is a vertical cross-sectional view of a diaphragm 35.

The flow regulating device 1 shown in FIGS. 1 and 2 is used in regulating the flow rate of fluid including liquid chemical, pure water and the like for producing semiconductor devices or the like, is generally provided in a fluid supplying line (not shown). Such a regulating device is also generally referred to as "regulator".

A housing part 10, which forms an external shape of the flow regulating device 1, includes three housings 10a, 10b, and 10c, which are fastened to one another by a fastener (not shown). The housing 10b is made of fluororesin that is excellent in chemical resistance, for example, a resin material such as PTFE (polytetrafluoroethylene) and PFA (tetrafluoroethylene-perfluoroalkyl vinyl copolymer). The housings 10a and 10c are made of a resin material such as PVD (polyvinylchloride) and PFA.

The housing 10a is a base part of the flow regulating device 1, and fixed by a fastening bolt to an enclosure (not shown) in which the flow regulating device 1 is disposed. The housing 10b (second housing) includes an inlet port 21, an outlet port 24, a first space 22 (valve chamber), a second space 23 (fluid chamber), an upstream flow channel 15, a downstream flow channel 16, and an intermediate flow channel 25, all these elements being formed in the housing 10b. The upstream flow channel 15 is a flow channel connecting the first space 22 to the inlet port 21, while the downstream flow channel 16 is one connecting the intermediate flow channel 25 to the outlet port 24.

Fluid introduced into the inlet port 21 passes through the upstream flow channel 15 to flow into the first space 22. The fluid introduced into the first space 22 flows into the second space 23 through a gap between the outer circumferential surface of a valve element (valve element part) 31 and a valve seat (valve seat part) 11. The fluid introduced into the second space 23 passes through the intermediate flow channel 25 and the downstream flow channel 16 to flow out from the outlet port 24.

As shown in FIG. 3, the housing 10c has a cylindrical shape with its center axis that is an axis line A. The axis line A is located in the center of the pressure chamber and also located in the centers of the first and second spaces 22 and 23. The housing 10c (first housing) includes a pressure chamber 12 formed therein into which an operating air (operating gas) is externally introduced from an air pressure supply source (not shown).

As shown in FIG. 3, the pressure chamber 12 includes a narrow portion 12a having a width W1 in the diametrical direction perpendicular to the axis line A, and a wide portion 12b having a width W2 in the diametrical direction perpendicular to the axis line A. The narrow portion 12a has the width W1 that is smaller than the width W2 of the wide portion 12b, and is located at a farther position from the valve seat 11 than the wide portion 12b as described later.

As shown in FIGS. 1 and 3, the housing 10c includes a first flow channel 17 for introducing the operating air from an operating port 13 into the narrow portion 12a, and a second flow channel 18 for the operating air from the first flow channel 17 into the wide portion 12b without having the operating air pass through the narrow portion 12a.

The first flow channel 17 and the second flow channel 18 enable the operating air to be introduced into the narrow portion 12a and the wide portion 12b, respectively, of the pressure chamber 12, thereby allowing the pressure of the operating air to be uniform in the pressure chamber 12, which facilitates the smooth movement of the guide member 42 in the pressure chamber 12.

The housing 10b mainly houses the valve seat 11, the valve element 31 which is movable in a direction perpendicular to the valve seat 11 (vertical direction in FIG. 1), the diaphragm 35 connected to the valve element 31, and a spring 36 that generates an urging force for pressing the valve element 31 into contact with the valve seat 11.

The guide member 42 is a member that is connected to the diaphragm 35, and is movable in a center axis direction X of the valve element 31 with the movement of the valve element 31 while being in a state in which the guide member is in contact with the inner circumferential surface of the pressure chamber 12. As shown in FIG. 4B, the guide member 42 includes a first guide portion 42a and a second guide portion 42b.

The first guide portion 42a has a width W3 that is substantially the same width as the width W1 of the narrow portion 12a of the pressure chamber 12. The expression "substantially same width" means that the width W3 is a little smaller than the width W1 so that the first guide portion 42a can move while being in contact with the narrow portion 12a.

Similarly, the second guide portion 42a has a width W4 that is substantially the same width as the width W2 of the wide portion 12b of the pressure chamber 12. The expression "substantially same width" means that the width W4 is a little smaller than the width W2 so that the second guide portion 42b can move while being in contact with the wide portion 12b.

The lower end surface of the guide member 42 is provided with a depression 42c (Refer to FIG. 4B) formed therein which can accommodate a projection 35a (Refer to FIG. 5) formed in the diaphragm 35. The depression 42c has a female screw portion formed in the inner peripheral wall thereof, which is fastened to (connected to) a male screw formed on the outer peripheral wall of the projection 35a.

The diaphragm 35 is provided between the lower end surface of the housing 10c and the second space 23 and between the lower end surface of the guide member 42 and the second space 23.

As shown in FIG. 4, grooves 42d are provided at four sites on the outer circumferential surface of the second guide portion 42b of the guide member 42, and extend in the direction of the center axis X. The grooves 42d enable the passage of the operating gas between the second guide portion 42b and the wide portion 12b of the pressure chamber 12.

The remaining portions of the second guide portion 42b other than the grooves 42d are in contact with the inner surface of the wide portion 12b so as not to allow the passage of the operating gas. On the other hand, the grooves 42d are not contact with the inner surface of the wide portion 12b so as to allow the passage of the operating gas.

This configuration enables the passage of the operating gas between two regions in the pressure chamber 12: One region is defined by the upper surface of the second guide portion 42b and the inner surface of the housing 10c in the pressure chamber 12, and the other region is defined by a thin film portion 35c of the diaphragm 35 and the inner surface of the housing 10c.

Thus, the passage of the operating air in the pressure chamber 12 allows the pressure to be uniform in the pressure chamber, thereby facilitating the smooth movement of the guide member 42 in the pressure chamber 12.

When the diaphragm 35 receives an external force according to the pressure difference between the second space 23 and the pressure chamber 12, the thin film portion 35c is displaced, and the base portion 35b moves in the vertical direction (vertical direction in FIG. 1) as described later. The movement of the base portion 35*b* causes the valve element 31, which is in contact with the diaphragm 35, to move along the center axis X of the valve element 31. The movement of the valve element 31 causes a corresponding change in the gap between the valve seat 11 and the outer circumferential surface of the valve element 31, whereby the flow rate of fluid passing through the flow regulating device 1 is adjusted.

The surface of the diaphragm 35 facing the pressure chamber 12 is a surface which faces the operating gas (gas facing surface) in the pressure chamber 12. The surface of the diaphragm 35 facing the second space 23 is a surface which faces fluid (fluid facing surface) in the second space 23.

As shown in FIG. 5, the diaphragm 35 includes the base portion 35*b* provided substantially at the center thereof, the annular thin film portion 35*c* provided at the outer peripheral edge of the base portion 35*b*, and a thick outer peripheral edge portion 35*d* provided at the outer peripheral edge of the thin film portion 35*c*. The thickness of the thin film portion 35*c* is smaller than that of the base portion 35*b*, and the thickness of the outer peripheral edge portion 35*d* is greater than that of the thin film portion 35*c*.

As shown FIG. 1, the width (the length in a diametrical direction perpendicular to the center axis X) of the base portion 35*b* is the substantially same as the width W4 of the second guide portion 42*b*. This configuration ensures that the pressure received by the base portion 35*b* from fluid in the second space 22 is transmitted to the second guide portion 42*b*. Thus, this configuration prevents the base portion 35*b* from becoming deformed by the pressure from fluid.

The second guide portion 42 is preferably formed of a material with a higher strength than that of the base portion 35*b* in order to ensure that the base portion 35*b* of the diaphragm 35 is prevented from deformation. For example, when the base portion 35*b* is formed of PTFE, the guide member 42 is preferably formed of PVDF (polyvinylidene fluoride).

The upper surface of the base portion 35*b* includes a projection 35*a* projecting upward substantially at the center thereof. The lower surface of a part of the projection 35*a*, includes a recess 35*e* depressing upward, into which the protrusion 31*a* of the valve element 31 can be inserted.

As shown in FIG. 3, the lower end surface of the housing 10*c* has a protective shape 41, which prevents excessive upward deformation of the thin film portion 35*c* when the thin film portion 35*c* of the diaphragm 35 becomes deformed (flexes) upward by the pressure of fluid introduced into the second space 23.

The outer peripheral edge portion 35*d* of the diaphragm 35 is supported by the housings 10*c* and 10*d* and is clamped therebetween. This allows the pressure chamber 12 into which the operating air is introduced from the operating port 13 formed in the housing 10*c*, and the second space 23 into which fluid flows to become sealed spaces, respectively.

As shown in FIG. 1, the valve element 31, which is housed in the housing 10*b*, is provided with a diaphragm (valve side diaphragm) 45 integrally formed therewith at its outer peripheral portion near an end (lower end) thereof. The valve element 31 that is integrally provided with the diaphragm includes the protrusion 31*a* at the upper end thereof.

The diaphragm 45 that is integrally formed with the valve element 31 includes a thin film portion 45*c* extending radially outwardly from the valve element 31, an outer peripheral portion 45*d* that is thicker than the thin film portion 45*c* and is provided at the outer peripheral edge of the thin film portion, and an annular projection 45*f* that is provided on the upper surface of the outer peripheral portion 45*d* to protrude upward.

The outer diameter of the diaphragm 45 is substantially the same as the inner diameter of a diaphragm inserting groove formed at the lower end of the housing 10*b*. When the diaphragm 45 is inserted into the diaphragm inserting groove from below the housing 10*b* and is housed in the diaphragm inserting groove, the annular projection 45*f* provided on the diaphragm 45 is fitted into an annular recess formed on the outer peripheral edge of the upper surface of the diaphragm inserting groove.

A spring holder 47 is provided at an end of the valve element 31. The upper surface of the spring holder 47 has a protective shape which, when the diaphragm 45 that is integrally formed with the valve element 31 becomes deformed by the fluid flowing in the first space 22, can prevent excessive deformation of the thin film portion 45*c* of the diaphragm 45 to thereby maintain the shape of the thin film portion 45*c*.

The spring holder 47 includes a downwardly-depressed recess 47*b* provided substantially at the center of the upper surface thereof, into which the end of the valve element 31 can be inserted. The spring holder 47 includes a stepped portion located midway of the side wall, and the diameter of the lower portion of the side wall below the stepped portion is smaller than that of the higher portion of the sidewall above the stepped portion. The spring 36 is provided over the outer periphery of the spring holder 47 below the stepped portion.

A valve element restricting hole 49 having a cylindrical shape is formed at substantially the center of the housing 10*c*. The spring 36 can be held between the valve element restricting hole 49 and the spring holder 47. A spring groove 51 is formed at the bottom surface of the valve element restricting hole 49 for accommodating the lower end of the spring 36 when the spring 36 is accommodated in the valve element restricting hole 49.

The spring 36 is connected to the valve element 31 by having the spring 36 accommodated in the valve element restricting hole 49 of the housing 10*a* and inserting the lower end of the spring holder 47 to which the diaphragm 45 is connect, into the spring 36. The elastic force of the spring 36 in its expanding direction causes an urging force exerted on the valve element 31 that is connected to the spring 36, in the direction to bring the outer circumferential surface of the valve element 31 into contact with the valve seat 11.

Thus, the valve element 31 is accommodated in the first space 22 (valve chamber), and is movable along the center axis X thereof by the upward urging force caused by the spring 36 and the downward urging force caused by the pressure in the pressure chamber 12 transmitted through the diaphragm 35. The movement of the valve element along the center axis X brings the outer circumferential surface of the valve element 31 into contact with or away from the valve seat 11 provided on the inner circumferential surface of the first space 22. When the outer circumferential surface of the valve element 31 comes into contact with the valve seat 11, a closed state is formed in which communication is shut off between the upstream flow channel 15 and the downstream flow channel 16. When the outer circumferential surface of the valve element 31 is away from the valve seat 11, an open state is formed in which communication is provided between the upstream flow channel 15 and the downstream flow channel 16.

Next, the operation of the flow regulating device 1 is described in which the flow rate of fluid is regulated according to the pressure of the operating gas introduced into the device through the operating port 13.

In the flow regulating device 1 in its fully closed state as shown in FIG. 1, fluid is introduced into the device through the inlet port 21 from the fluid supplying line. The fluid flowing into the inlet port 21 stays in the first space 22 as the valve element 31 is in contact with the valve seat 11.

When the operating air is supplied from the operating port 13 to the pressure chamber 12, the pressure chamber 12 is pressurized. With the pressurization of the pressure chamber 12, an urging force is exerted on the guide member 42 in the direction to move the guide member downward. When the pressure chamber 12 is pressurized and the downward urging force caused by the pressure in the pressure chamber 12 exceeds the upward urging force caused by the spring 36, the diaphragm 35 moves downward. The valve element 31 connected to the diaphragm 35 is away from the valve seat 11, and the fluid remaining in the first space 22 flows into the second space 23.

The movement distance of the valve element 31 along the direction of its center axis X (vertical direction) changes depending on the pressure of the operating air in the pressure chamber 12. Thus, the valve opening degree of the flow regulating device 1 is adjusted depending on the pressure in the pressure chamber 12. Accordingly, by adjusting the pressure in the pressure chamber 12, an adjustment is made to the flow rate of fluid passing through the gap between the outer circumferential surface of the valve element 31 and the valve seat 11.

The fluid passing through the gap between the outer circumferential surface of the valve element 31 and the valve seat 11 flows through the second space 23 into the intermediate flow channel 25. The fluid introduced into the intermediate flow channel 25 flows through the downstream flow channel 16 and then flows out of the outlet port 24.

As the pressure of the operating air in the pressure chamber 12 increases, the valve opening degree of the flow regulating device 1 is raised to reach the fully open state as shown in FIG. 2 in the end. When the opening degree of the flow regulating device 1 reaches the fully open state as shown in FIG. 3, the outer peripheral edge of the base portion 35b of the diaphragm 35 comes into contact with the housing 10b.

When the base portion 35b comes into contact with the housing 10b, the fluid in the second space 23 flows through a connecting flow channel 30 into the intermediate flow channel 25. The use of the connecting flow channel 30 allows for the achievement of the maximum flow rate of fluid (the flow rate of fluid when the valve opening degree is one in the fully open state) flowing out of the outlet port 24 even when the valve opening degree of the flow regulating device 1 reaches the fully open state and the base portion 35b comes into contact with the housing 10b.

Next, the operation of the flow regulating device 1 is described in which the fluid flow is shut off in a flow channel that is connected to the outlet port 24. In the present embodiment, when the fluid flow is shut off in the flow channel that is connected to the outlet port 24, the flow rate of fluid flowing out of the outlet port 24 decreases while the fluid continues to flow into the inlet port 21. This raises the pressure of the fluid in the second space 23.

When the pressure of the fluid in the second space 23 increases such that the total force of the upward urging force caused by the pressure of the fluid and exerted on the lower surface of the diaphragm 35 and the upward urging force caused by the spring 36 and exerted on the diaphragm 35 via the valve element 31 exceeds the downward urging force caused by the air pressure in the pressure chamber 12 and exerted on the diaphragm 35, the diaphragm 35 moves upward. Then, the valve element 31 connected to the diaphragm 35 comes into contact with the valve seat 11 to shut off communication between the first space 22 and the second space 23.

In the flow regulating device 1 of the present embodiment, the valve element 31 is connected to the diaphragm 35, and the diaphragm 35 is connected to the guide member 42. The guide member 42 is movable in the direction of the center axis X of the valve element 31 with the movement of the valve element 31 while being in the state in which the first guide portion 42a is in contact with the inner circumferential surface of the pressure chamber 12.

Thus, the first guide portion 42a is positioned in the narrow portion 12a of the pressure chamber 12 such that the first guide portion is movable with the movement of the valve element 31.

As the first guide portion 42a moves while being in contact with the inner circumferential surface of the pressure chamber 12, the center axis of the guide member 42 is brought in alignment with that of the pressure chamber 12. The center axis of the guide member 42 is in alignment with the center axis X of the valve element 31, and the center axis of the pressure chamber 12 is in alignment with the axis line A of the first space 22. Thus, when the center axis of the guide member 42 is in alignment with that of the pressure chamber 12, the center axis X of the valve element 31 is in alignment with the axis line A of the first space 22.

As the second guide portion 42b also moves while being in contact with the inner circumferential surface of the pressure chamber 12 in a similar manner to the first guide portion 42a, the center axis X of the valve element 31 is brought in more accurate alignment with the axis line A of the first space 22.

This configuration thereby suppresses misalignment (axial misalignment) between the direction of the center axis X of the valve element 31 connected to the guide member 42 and that of the center axis of the pressure chamber 12. Thus, this configuration suppresses the creation of a gap between the valve element 31 and the valve seat 11 when the valve element 31 comes into contact with the valve seat 11, thereby improving fluid shut-off performance at the contact location between the valve element 31 and the valve seat 11. As the narrow portion 12a is located at a farther position from the valve seat 11 than the wide portion 12b, axial misalignment caused at a farther position from the valve seat 11 can be properly suppressed so as to prevent the creation of a gap between the valve element 31 and the valve seat 11.

In the flow regulating device 1 of the present embodiment, the protrusion 31a of the valve element 31 is connected by clearance-fit with the recess 35e of the diaphragm 35. Thus, after the outer circumferential surface of the valve element 31 comes into contact with the valve seat 11, if the pressure received by the diaphragm 35 from the fluid in the second space 23 further increases, then the protrusion 31a of the valve element 31 is disconnected from the recess 35e of the diaphragm 35.

In cases where the protrusion 31a of the valve element 31 is disconnected from the recess 35e of the diaphragm 35, since the second guide portion 42b has a width greater than the narrow portion 12a, the second guide portion 42b is restricted from entering into the narrow portion 12a. Thus, the diaphragm 35 disconnected from the protrusion 31a is prevented from becoming excessively deformed.

After the protrusion 31a of the valve element 31 is disconnected from the recess 35e of the diaphragm 35, when the pressure received by the diaphragm 35 from the fluid in the second space 23 decreases, the diaphragm 35 moves downward to bring the protrusion 31a of the valve element 31 into contact with the recess 35e of the diaphragm 35 again. The upper end of the protrusion 31a has a hemisphere shape which facilitates the connection to the recess 35e. As the connection between the protrusion 31a of the valve element 31 and the recess 35e of the diaphragm 35 becomes more firm, the center axis X of the valve element 31 comes into alignment with the center axis of the diaphragm 35.

As described above, in the flow regulating device 1 of the present embodiment, the guide member 42 connected to the valve element 31 via the diaphragm 35 includes the first guide portion 42a having substantially the same width as the narrow portion 12a of the pressure chamber 12, and the first guide portion 42a is positioned in a state that it is movable with the movement of the valve element 31. Thus, the center axis of the pressure chamber 12 is brought into alignment with the center axis X of the valve element 31 to properly position the first guide portion 42a at the narrow portion 12a such that no gap is created between the valve element 31 and the valve seat 11.

In addition, as the narrow portion 12a is located at a farther position from the valve seat 11 than the wide portion 12b, axial misalignment caused at a farther position from the valve seat 11 can be properly suppressed so as to prevent the creation of a gap between the valve element 31 and the valve seat 11.

Moreover, in the flow regulating device of the above aspect, the second guide portion to which the pressure of fluid is transmitted through the diaphragm, has a width that is greater than the first guide portion having substantially the same width as the narrow portion of the pressure chamber. Thus, even when the diaphragm receives a high pressure from fluid, as the second guide portion is restricted from entering into the narrow portion, the diaphragm can be prevented from becoming excessively deformed.

Thus, according to the above aspect, a flow regulating device can be provided in which fluid shut-off performance is improved at the contact location between a valve element part and a valve seat part while preventing excessive deformation of a diaphragm.

In the flow regulating device 1 of the present embodiment, the second guide portion 42b has substantially the same width as the wide portion 12b. This configuration allows the second guide portion 42b to be properly positioned in the wide portion 12b of the pressure chamber 12 such that the second guide portion 42b is movable with the movement of the valve element 31. Thus, the flow regulating device 1 is provided in which the creation of the gap between a valve element 31 and the valve seat 11 is prevented to thereby improve fluid shut-off performance at the contact location between the valve element 31 and the valve seat 11.

In the flow regulating device 1 of the present embodiment, the grooves 42d are provided at a plurality of sites on an outer circumferential surface of the second guide portion 42b, where the grooves extend along the axial direction and enable the passage of the operating air therethrough between the inner circumferential surface of the wide portion 12b of the pressure chamber 12 and the outer circumferential surface of the second guide portion 42b.

This configuration enables the passage of the operating air in the pressure chamber 12, thereby allowing the pressure to be uniform in the pressure chamber, which facilitates the smooth movement of the guide member 42 in the pressure chamber 12.

In the flow regulating device 1 of the present embodiment, the diaphragm 35 includes the base portion 35b having substantially the same width as the second guide portion 42b, and the annular thin film portion 35c provided at the outer peripheral edge of the base portion 35b.

This configuration allows the pressure received by the base portion 35b of the diaphragm 35 from the fluid to be transmitted to the second guide portion 42b, thereby preventing the base portion 35b of the diaphragm 35 from becoming deformed by the pressure from the fluid.

In the flow regulating device 1 of the present embodiment, the second guide portion 42b is preferably formed of a material with a higher strength than that of the base portion 35b.

This ensures more that the base portion 35b of the diaphragm 35 is prevented from becoming deformed by the pressure from the fluid.

In the flow regulating device 1 of the present embodiment, the housing 10c includes the first flow channel 17 for introducing the operating air into the narrow portion 12a of the pressure chamber 12, and the second flow channel 18 for introducing the operating air from the first flow channel 17 into the wide portion 12b of the pressure chamber 12 without having the operating air pass through the narrow portion 12a.

This configuration enables the operating air to be externally introduced into the narrow portion 12a and the wide portion 12b, respectively, of the pressure chamber 12, thereby allowing the pressure of the operating air to be uniform in the pressure chamber 12, which facilitates the smooth movement of the guide member 42 in the pressure chamber 12.

In the flow regulating device 1 of the present embodiment, the diaphragm 35 is integrally formed with the guide member 42. This configuration reduces the number of assembly man-hours for the flow regulating device 1, and allows the products to be manufactured with less variations caused due to assembly errors from product to product.

(Another Embodiment)

In the above description, the second guide portion 42a has the width W4 that is substantially the same width as the width W2 of the wide portion 12b of the pressure chamber 12. However, in another aspect of the invention, the second guide portion may have a different width. For example, the second guide portion 42b may have a width W4 that is greater than the width of the first guide portion 42a and is equal to or smaller than the width W2 of the wide portion 12b of the pressure chamber 12.

This configuration results in that, even when the diaphragm 35 receives a high pressure from fluid, the second guide portion 42b is restricted from entering into the narrow portion 12a and thus the diaphragm 35 is prevented from becoming excessively deformed.

In the above description, the diaphragm 35 and the guide member 42 are connected to each other by a female screw and a male screw. However, in another aspect of the invention, they may be connected to each other in a different way. For example, the diaphragm 35 may be integrally formed with the guide member 42 as a single piece member. In this case, the single piece member includes the diaphragm 35 and the guide member 42 which are integrally formed and thus are connected with each other.

The invention claimed is:
1. A flow regulating device comprising:
a first housing including a pressure chamber formed therein into which an operating gas is externally introduced;
a second housing including a valve chamber formed therein, an upstream flow channel formed therein for providing communication between the valve chamber and an inlet port, and a downstream flow channel formed therein for providing communication between the valve chamber and an outlet port;
a valve element part housed in the valve chamber, the valve element part being movable into contact with or away from a valve seat part provided on an inner circumferential surface of the valve chamber so as to form a closed state in which communication is shut off between the upstream flow channel and the downstream flow channel, or an open state in which communication is provided between the upstream flow channel and the downstream flow channel;
a diaphragm connected to the valve element part, the diaphragm having a fluid facing surface which faces a fluid, and a gas facing surface which faces the operating gas; and
a guide member connected to the diaphragm, the guide member being slidably movable on an inner surface of the pressure chamber in an axial direction of the valve element part with the movement of the valve element part while being in a state in which the guide member is in contact with the inner circumferential surface of the pressure chamber, the guide member having a first end surface facing the pressure chamber and a second end surface being opposite from the first end and facing the diaphragm, the second end of the guide member contacting the diaphragm,
wherein the pressure chamber is a chamber which is formed by the first end surface of the guide member and an inner circumferential surface of the first housing in which the guide member is inserted in a state where the guide member contacts with the inner circumferential surface of the first housing, and
wherein the guide member moves along the inner circumferential surface of the first housing by an urging force exerted on the first end surface of the guide member by the operating gas introduced into the pressure chamber.

2. The flow regulating device according to claim 1, wherein the pressure chamber comprises a wide portion having a greater width in a diametrical direction perpendicular to the axial direction, and a narrow portion located at a farther position from the valve seat part than the wide portion, and having a smaller width in the diametrical direction than the wide portion; and
wherein the guide member comprises a first guide portion having substantially the same width as the narrow portion, and a second guide portion having a width that is greater than the first guide portion and is equal to or smaller than the wide portion.

3. The flow regulating device according to claim 2, wherein the second guide portion has substantially the same width as the wide portion.

4. The flow regulating device according to claim 3, wherein the diaphragm comprises a base portion having substantially the same width as the second guide portion, and an annular thin film portion provided at an outer peripheral edge of the base portion.

5. The flow regulating device according to claim 4, wherein the base portion is formed of PTFE, and wherein the second guide portion is formed of PVDF.

6. The flow regulating device according to claim 2, wherein the diaphragm comprises a base portion having substantially the same width as the second guide portion, and an annular thin film portion provided at an outer peripheral edge of the base portion.

7. The flow regulating device according to claim 6, wherein the base portion is formed of PTFE (polytetrafluoroethylene), and wherein the second guide portion is formed of PVDF (polyvinylidene fluoride).

8. The flow regulating device according to claim 2, wherein the first housing comprises a first flow channel for introducing the operating gas into the narrow portion of the pressure chamber, and a second flow channel for introducing the operating gas from the first flow channel directly into the wide portion of the pressure chamber.

9. The flow regulating device according to claim 1, wherein the diaphragm is integrally formed with the guide member.

10. A flow regulating device comprising:
a first housing including a pressure chamber formed therein into which an operating gas is externally introduced;
a second housing including a valve chamber formed therein, an upstream flow channel formed therein for providing communication between the valve chamber and an inlet port, and a downstream flow channel formed therein for providing communication between the valve chamber and an outlet port;
a valve element part housed in the valve chamber, the valve element part being movable into contact with or away from a valve seat part provided on an inner circumferential surface of the valve chamber so as to form a closed state in which communication is shut off between the upstream flow channel and the downstream flow channel, or an open state in which communication is provided between the upstream flow channel and the downstream flow channel;
a diaphragm connected to the valve element part, the diaphragm having a fluid facing surface which faces a fluid, and a gas facing surface which faces the operating gas; and
a guide member connected to the diaphragm, the guide member being movable in an axial direction of the valve element part with the movement of the valve element part while being in a state in which the guide member is in contact with an inner circumferential surface of the pressure chamber,
wherein the pressure chamber comprises a wide portion having a greater width in a diametrical direction perpendicular to the axial direction, and a narrow portion located at a farther position from the valve seat part than the wide portion, and having a smaller width in the diametrical direction than the wide portion,
wherein the guide member comprises a first guide portion having substantially the same width as the narrow portion, and a second guide portion having a width that is greater than the first guide portion and is equal to the wide portion,
wherein grooves are provided at a plurality of sites on an outer circumferential surface of the second guide portion, the grooves extending along the axial direction and enabling the passage of the operating gas therethrough between the inner circumferential surface of the wide portion of the pressure chamber and the outer circumferential surface of the second guide portion.

11. The flow regulating device according to claim 10, wherein the diaphragm comprises a base portion having substantially the same width as the second guide portion, and an annular thin film portion provided at an outer peripheral edge of the base portion.

12. The flow regulating device according to claim 11, wherein the base portion is formed of PTFE, and wherein the second guide portion is formed of PVDF.

* * * * *